United States Patent
Hiltunen et al.

(10) Patent No.: US 8,095,184 B2
(45) Date of Patent: Jan. 10, 2012

(54) WIRELESS CONTROL OF OPERATING CHARACTERISTICS OF ELECTRONIC DATA CARDS

(75) Inventors: Miska Hiltunen, Witten (DE); Heikki Tuominen, Tampere (FI)

(73) Assignee: Nokia Corporation (FI)

( * ) Notice: Subject to any disclaimer, the term of this patent is extended or adjusted under 35 U.S.C. 154(b) by 1231 days.

(21) Appl. No.: 10/363,742

(22) PCT Filed: Sep. 6, 2001

(86) PCT No.: PCT/IB01/01955
§ 371 (c)(1),
(2), (4) Date: Sep. 17, 2003

(87) PCT Pub. No.: WO02/21867
PCT Pub. Date: Mar. 14, 2002

(65) Prior Publication Data
US 2004/0042604 A1    Mar. 4, 2004

(30) Foreign Application Priority Data

Sep. 7, 2000 (GB) .................................. 0021988.1

(51) Int. Cl.
*H04M 1/00*   (2006.01)
(52) U.S. Cl. ............... 455/558; 455/557; 455/556.2; 455/555; 455/419
(58) Field of Classification Search .......... 455/555, 455/419, 558, 375, 406, 410, 556.2, 557, 455/562; 710/301
See application file for complete search history.

(56) References Cited

U.S. PATENT DOCUMENTS

| | | | |
|---|---|---|---|
| 5,029,233 A | | 7/1991 | Metroka |
| 5,249,302 A | | 9/1993 | Metroka |
| 6,092,133 A | * | 7/2000 | Erola et al. ................. 710/301 |
| 6,101,477 A | * | 8/2000 | Hohle et al. .................. 705/1 |
| 6,434,379 B1 | * | 8/2002 | Despres et al. ............ 455/406 |
| 6,434,402 B1 | * | 8/2002 | Davison et al. ............ 455/555 |
| 6,480,710 B1 | * | 11/2002 | Laybourn et al. .......... 455/406 |
| 6,490,443 B1 | * | 12/2002 | Freeny, Jr. ................. 455/406 |
| 6,557,753 B1 | * | 5/2003 | Beaujard et al. ........... 235/375 |
| 6,829,593 B1 | * | 12/2004 | Ritter et al. ................. 705/51 |
| 6,859,650 B1 | * | 2/2005 | Ritter ......................... 455/406 |
| 7,083,090 B2 | * | 8/2006 | Zuili ........................... 235/383 |

(Continued)

FOREIGN PATENT DOCUMENTS

EP    0378450    7/1990

(Continued)

OTHER PUBLICATIONS

European Office Action for European Patent Application No. 08001322.0 dated Nov. 4, 2010.

(Continued)

*Primary Examiner* — Nay A Maung
*Assistant Examiner* — Richard Chan
(74) *Attorney, Agent, or Firm* — Banner & Witcoff, Ltd.

(57) ABSTRACT

A system comprising a first device and a second device having an electronic data card associated therewith, information on the electronic data card being useable by and accessible by the first device, wherein the first device is arranged to control the operating characteristics of the electronic data card of the second device. Thus the first device may power up/down the electronic data card, reset the electronic data card or change the clock or baud rate associated with the electronic data card.

27 Claims, 6 Drawing Sheets

U.S. PATENT DOCUMENTS

| | | | |
|---|---|---|---|
| 7,321,784 B2 * | 1/2008 | Serceki et al. | 455/557 |
| 7,363,056 B2 * | 4/2008 | Faisy | 455/558 |
| 7,769,342 B2 * | 8/2010 | Tabe | 455/3.06 |
| 7,818,451 B2 * | 10/2010 | Bal | 709/238 |

FOREIGN PATENT DOCUMENTS

| | | |
|---|---|---|
| EP | 0586081 | 3/1994 |
| EP | 1075155 | 2/2001 |
| JP | 10-68160 A | 3/1989 |
| JP | 07-046334 | 2/1995 |
| JP | 2000-076573 A | 3/2000 |
| JP | 2002-152840 A | 5/2002 |
| JP | 2007-312630 A | 12/2007 |
| WO | 9705729 | 2/1997 |
| WO | 9827767 A1 | 6/1998 |
| WO | 9858510 A1 | 12/1998 |
| WO | 9959360 A1 | 11/1999 |
| WO | 0011624 | 3/2000 |
| WO | 02063576 | 8/2002 |

OTHER PUBLICATIONS

Notification of Grounds of Rejection for Japanese Patent Application No. 2002-526144 dated Aug. 18, 2010.

* cited by examiner

CLIENT REQUESTS SERVER TO RESET THE SIM

CLIENT REQUESTING SERVER TO CHANGE SIM CLOCK RATE

CLIENT REQUESTING SERVER TO CHANGE SIM BAUD RATE

WIRELESS CONTROL OF OPERATING CHARACTERISTICS OF ELECTRONIC DATA CARDS

The present invention relates to portable radiotelephones, and more particularly, to the management of multiple portable radiotelephones.

In recent years, the penetration of portable radiotelephones has grown enormously, and now a large percentage of many populations possess a portable radiotelephone. An increasing number of people also possess multiple portable radiotelephones, for example a car mounted radiotelephone and a handheld portable radiotelephone. One problem with this is that a user ends up having multiple telephone numbers. This is confusing for people wishing to contact a user, since they may not know which radiotelephone the user is currently using. For the user, having multiple telephone numbers is also problematic, since each number will generally be billed separately, and may even be with a different network or have a different pricing structure. Consequently, a very unsatisfactory situation has arisen.

One way to overcome the above the above problems is for a user to have a single subscriber identification module (SIM) giving the user a single telephone number. If the user wishes to use more than one portable radiotelephone he removes the SIM from the current portable radiotelephone, for example a handheld portable radiotelephone, and inserts it into a further portable radiotelephone, for example a car mounted portable radiotelephone. One problem with this is that the SIM is not designed to be constantly inserted and removed from a device. Consequently, SIMs are generally mounted behind the battery of portable radiotelephones and therefore are not instantly accessible. In order to change a SIM from one phone to the next, a user must remove the battery of both portable radiotelephones, change the SIM and replace the battery. This is both a time consuming and cumbersome operation.

Accordingly, one aim of the present invention is to simplify the use of multiple portable radiotelephones.

In accordance with the invention there is provided a system comprising a first device and a second device having an electronic data card associated therewith, information on the electronic data card being useable by and accessible by the first device, wherein the first device is arranged to control the operating characteristics of the electronic data card of the second device.

Some examples of the operating characteristics that may be controlled by the first device are: the power supply of the electronic data card (e.g. power up/down, voltage etc); the resetting of the electronic data card; the clock rate of the electronic data card; the baud rate of the electronic data card; the stopping of the clock to the electronic data card. The operating characteristics relate to the operation/function of the electronic data card; this can also be viewed as the operational characteristics of the card reader associated with the electronic data card. The invention is directed how the data card functions rather than the content of the information read to or from the data card.

The electronic data card, for example, may be a Subscriber Identity Module (SIM) card or a cash card or a security card or any other form of electronic data card. The data card stores information needed by another device.

Preferably at least one of the first and second device is a radio telecommunications device and in particular a radio telephony device such as a cellular radio telephone.

In accordance with a second aspect of the invention there is provided a first device operable with a second device having an electronic data card associated therewith, information on the electronic data card of the second device being useable by and accessible by the first device, wherein the first device is arranged to control the operating characteristics of the electronic data card of the second device.

In accordance with a third aspect of the invention there is provided a first device having an electronic data card associated therewith, said first device being operable with a second device, information on the electronic data card of the first device being useable by and accessible by the second device, wherein the first device is arranged such that the operating characteristics of the electronic data card of the first device are controlled by the second device.

In accordance with a further aspect of the invention there is provided a method of controlling the operation of a first device having an electronic data card associated therewith, information on the electronic data card being useable by and accessible by a second device, wherein the operating characteristics of the electronic data card of the first device are controlled by the second device.

One advantage of the present invention is that the information contained in a SIM may be transferred from one portable radiotelephone to another without having to physically transfer the SIM. This is a quick and simple procedure which eliminates unnecessary wear and tear on the SIM.

A further advantage of the present invention is that the user only has a single SIM and hence a single telephone number. This removes the need for people wishing to contact the user to have multiple telephone numbers for the user. For the user, having a single telephone number removes the confusion of having multiple SIMs supplied by different companies and being billed independently.

Yet a further advantage of the present invention is that, since the terminal which uses the SIM information actually controls the SIM reader, the functionality of the SIM reader can be simpler. In other words, the intelligence required for reading the SIM information can be predominantly in the terminal which reads the SIM information.

The invention will now be described, by way of example only, with reference to the accompanying diagrams, in which.

Figure 1:
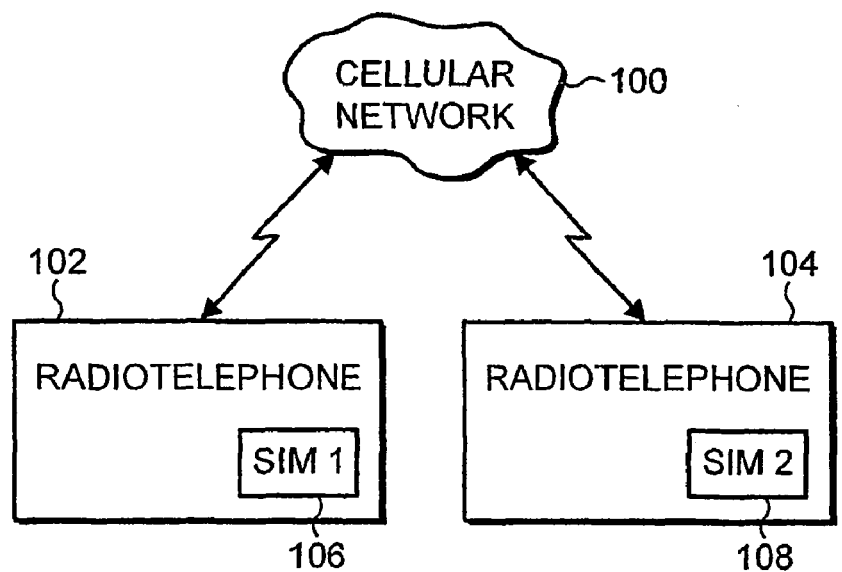
FIG. 1 is a block diagram showing a number of portable radiotelephones connected to a cellular network according to the prior art.

FIG. 1 is a block diagram showing a number of portable radiotelephones connected to a cellular network according to the prior art. A radiotelephone 102 has an electronic data card 106. In the example shown this is a subscriber identification module (SIM). The SIM provides the radiotelephone 102 with a subscriber number (telephone number) and enables the radiotelephone 102 to connect to the cellular network 100. Once connected to the cellular network, the radiotelephone 102 functions to allow calls to be made and received in the normal manner which will be understood by those skilled in the art. A second radiotelephone 104 having a SIM 108 is also shown, which functions as described above.

Figure 2:
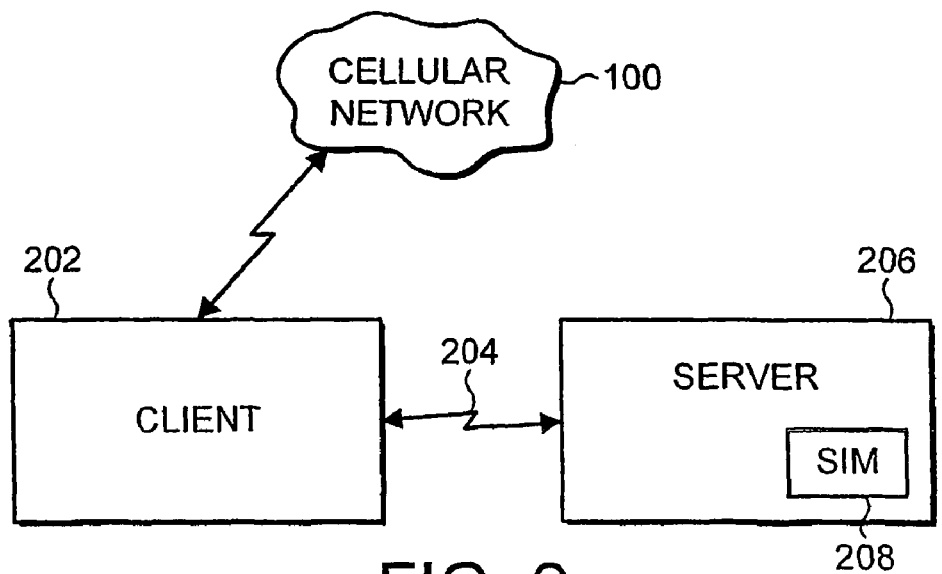
FIG. 2 is a block diagram showing a portable radiotelephone connected to a cellular network according to a first embodiment of the present invention.

FIG. 2 is a block diagram showing a portable radiotelephone connected to a cellular network according to a first embodiment of the present invention. A radiotelephone 206 is shown having a SIM 208. In this example, the radiotelephone 206 could be a hand-portable radiotelephone and the radiotelephone 202 could be a car mounted radiotelephone. If a user having the radiotelephone 206 gets into a car having radiotelephone 202, it is desirable for the user to be able to use the car mounted radiotelephone rather than the hand-portable radiotelephone. This is because, for example, car mounted radiotelephones often have a built in hands-free kit, which is important from safety aspects, and may also have an external antenna which gives improved performance. The radiotelephones 206 and 202 are equipped with functionality to allow them to communicate with one another using a local wireless connection, such as a low powered radio frequency (LPRF) link, a Bluetooth connection, or other communication means such as an infra-red link. Through the wireless link, the radiotelephone 202 is able to acquire information from the SIM contained in the radiotelephone 206 to enable the radiotelephone 202 to function as if it had the SIM inserted itself. For example, when a user gets into a car having a radiotelephone 202, a communication channel 204 is automatically set-up to allow the SIM information to be transferred. Any calls made to the radiotelephone 206 will thus be received by the radiotelephone 202. Additionally, any calls made by the radiotelephone 202 will be as if made by the radiotelephone 206, and will be billed accordingly. The radiotelephone 202 may be used by more than one user. For example, a car mounted radiotelephone in a hire car would be used by each client renting the car. Preferably, it is not necessary for the user to reconfirm his personal identification number (PIN) when the information is obtained from the SIM.

Figure 14:
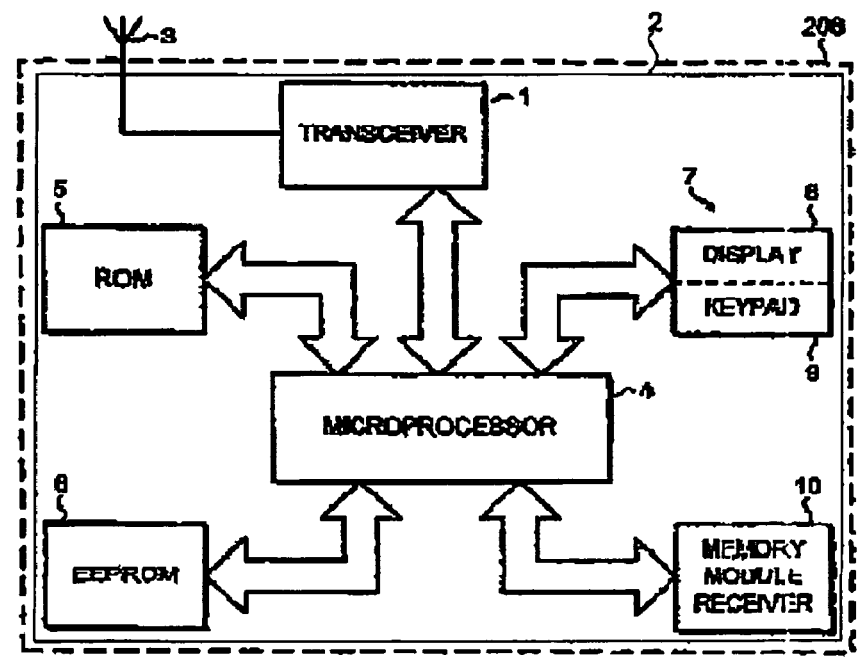
FIG. 14 show further details of the radio telephone of FIG. 2.

FIG. 14 shows further detail of the radio telephone 206. The telephone comprises a transceiver 1 and all the other features conventionally found in a cellular telephone. The transceiver is present within a handset housing 2 and is coupled to an external antenna 3. As is conventional, a microprocessor 4, enclosed within the transceiver housing 2, is employed to control all the basic functions of the telephone. Also enclosed within the housing 2 is a read only memory (ROM) 5 in which is stored the operating software for the telephone and which is coupled to the microprocessor 4. An EEPROM 6 is also coupled to the microprocessor, and is used for storing both NAM data (e.g. telephone number, system ID, electronic serial number) and abbreviated dialing information (i.e. a telephone number store). The handset also comprises a user interface 7 including a visual display 8 and a keypad 9, which is also coupled to the microprocessor 4.

The display, for example, may be a liquid crystal display, and the keypad 9 may comprise function keys, soft keys, and alphanumeric keys.

The handset also comprises a memory module receiver 10 (also referred to herein as a SIM card holder). The SIM card 208 is generally mounted in the SIM card holder 10 and reading of data from or to the SIM card is controlled by a SIM card reader (provided by microprocessor 4). This receiver can receive a memory module, such as a SIM card which, for example, may store subscriber related data (e.g. subscriber number, system ID, system channel scan data and serial number). This memory module receiver 10 is designed so that such a memory module can be plugged in or removed in a relatively straight forward manner. The receiver may form a recess or compartment in the handset housing 2. As well as containing subscriber related data, the SIM card may also contain other subscriber related information or applications, for example, repertory dialing information, charge meter information, function control information, an authentication algorithm etc. It is noted here that a SIM card is not a passive memory card, but also a processor card which includes not only a memory, but a facility for internally processing information, as is well known in the art. The data stored in the SIM is used by the microprocessor 7 to enable the telephone to communicate on the appropriate network. Other data stored on the SIM card may be used by the microprocessor for, for example, to control, modify, or monitor the operation of the telephone in a conventional manner.

The invention will now be described in further detail below.

As shown in FIG. 2, the radiotelephone 206 may also be designated as the server and radiotelephone 202 may be designated as the client. This terminology will be used throughout.

The server has direct access to a SIM, such as the SIM 208, and establishes a physical connection to it. The server grants clients, such as the client 202, access to the services and files of the SIM. As mentioned above, a typical example of a server is a portable phone that is brought into a car having a car phone (the client).

The client is connected to the server via a wireless link, such as LPRF or via a so called Bluetooth connection. The client may access the services and files of the SIM inside the server and may use this information to enable a connection to the cellular network.

The server is preferably prevented from having an active network connection during the time it is granting the client access to the SIM.

The operation of a client-server arrangement may be configured in a number of different ways. These include: establishing a network connection with the client using the subscription stored in the SIM; making a call from the client using the SIM of the server; receiving a call from the network at the client; and accessing data stored in the SIM in the server from the client.

The SIM is located in the server and can be accessed from the client using the procedures outlined below.

The present invention enables the transfer of the messages specified in the GSM 11.11 and 11.14 specification and, in addition to this, provides a means for transferring information about the status of the SIM and the server. This information is needed, for example, for SIM application toolkit procedures as defined in GSM 11.14.

The data transfer between the client and the SIM is done by exchanging Application Protocol Data Units (APDUs). The server acts as-a mediator, that passes APDUs from the SIM over the Bluetooth link to the client and vice versa.

The server is also responsible for establishing and maintaining the physical connection to the SIM. The server preferably should unblock the SIM before it grants the client access to it.

When the client requests information from the server about the SIM or about the server itself, the server sends the requested data over the Bluetooth link.

Preferably, the client and server are able to handle the following functionality, although those skilled in the art will appreciate that either one of the client or server, or both the client and server may possess the functionality. The required functionality includes, but is not limited to:

Connection Management—i.e. the ability to establish and remove a Bluetooth connection between the server and the client Transfer APDU—i.e. the ability to send APDUs over the Bluetooth link. APDUs sent to the SIM are referred to as 'command APDUs', while APDUs sent by the SIM are referred to as 'response APDUs'. Command APDUs and Response APDUs preferably only occur as pairs, i.e. each Command APDU is followed by a Response APDU. The APDU exchange is always initiated by the client.

Transfer ATR—i.e. the ability to send the content of the answer to reset (ATR) from the server to the client over the Bluetooth link. The ATR is sent by the SIM to the server after the SIM has been reset. It contains information about the interface provided by the SIM and the services on the SIM. Part of this information may also be needed in the client.

Transfer result of PPS procedure—i.e. the ability to send the result of the parameter and protocol selection (PPS) procedure from the server to the client over the Bluetooth link. A PPS procedure can be performed by the server in order to change interface parameters for the SIM. The result of this procedure might also be needed in the client.

Power SIM off—i.e. the ability to power the SIM off remotely. For example, the client requests the server to power the SIM off. This feature is needed e.g. for SIM ATK (Application Toolkit) purposes.

Power SIM on—i.e. the ability to power the SIM on remotely. For example, the client requests the server to power the SIM on. This feature is needed e.g. for SIM ATK purposes. If may be required for the server to unblock the SIM afterwards.

Reset SIM—i.e. the ability to reset the SIM remotely. For example, the client requests the server to reset the SIM. This feature is needed e.g. for SIM ATK purposes. It may be required for the server to unblock the SIM afterwards.

Change clock rate—i.e. the ability to change the clock rate remotely. For example, the client requests the server to change the clock rate of the SIM. The clock rate that is applied to the SIM by the server determines (together with the baud rate) the speed at which the server communicates with the SIM.

Change baud rate—i.e. the ability to change the baud rate remotely. For example, the client requests the server to change the baud rate of the SIM. The baud rate determines (together with the clock rate) the speed at which the server communicates with the SIM.

Transfer Card Holder Type—i.e. the ability to send Card Holder Type information from the server to the RAA Client over the Bluetooth link. The card holder type describes the format of SIM cards that can be inserted into a card reader (for example, ID-1 or Plug-In SIM). This information is needed e.g. for SIM ATK purposes.

Figure 3:
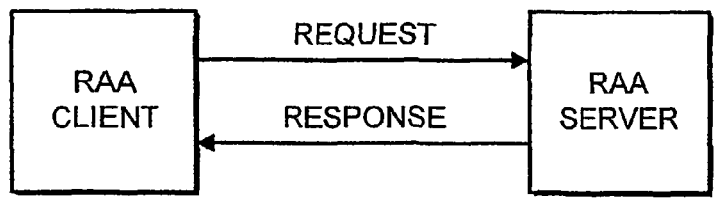
FIG. 3 is a block diagram showing the configuration and message flow between a client and a server according to the present invention.

FIG. 3 is a block diagram showing the configuration and message flow between a client and a server according to the present invention.

In a preferred embodiment, the data is transferred between the client and the server using multiple-byte fields in a standard network byte order (big endian), with more significant (high-order) bytes being transferred before less-significant (low-order) bytes.

Figure 4:
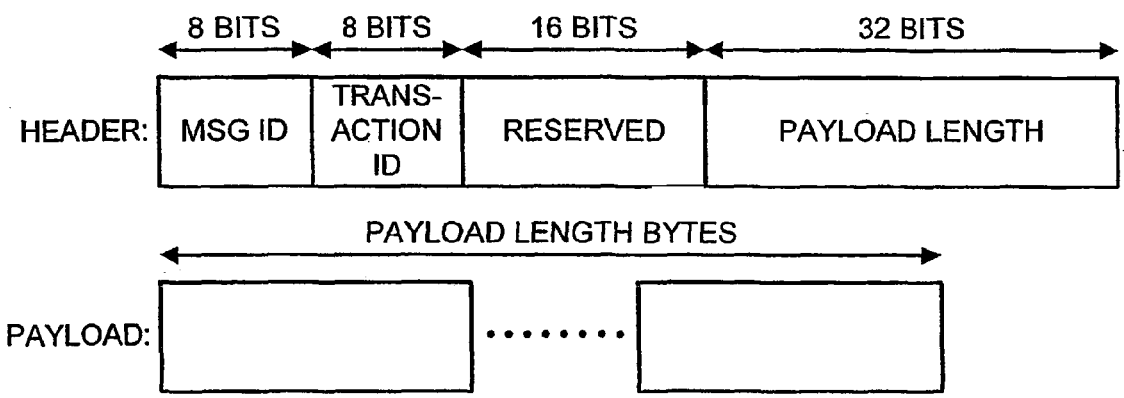
FIG. 4 is a diagram showing one embodiment of the structure of message used in the transfer of data.

FIG. 4 is a diagram showing one embodiment of the structure of message used in the transfer of data. Every protocol message consists of a message header followed by message-specific payload. The header contains five fields: a MSG ID, a Transaction ID, a reserved field and a Payload Length. The reserved field is used to provide data alignment in different microcomputer architectures.

Figure 5:
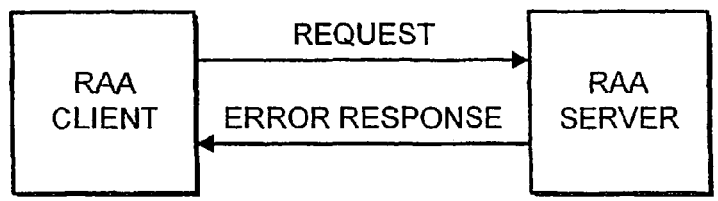
FIG. 5 is a diagram showing an error response.

All transactions except indications preferably consist of a request and a response message pair. Generally, each type of request message has a corresponding response message. However, if the server determines that a request is improperly formatted or for any reason the server cannot respond with the appropriate message type, it will respond with a Error Response message as shown in FIG. 5.

Figure 6:
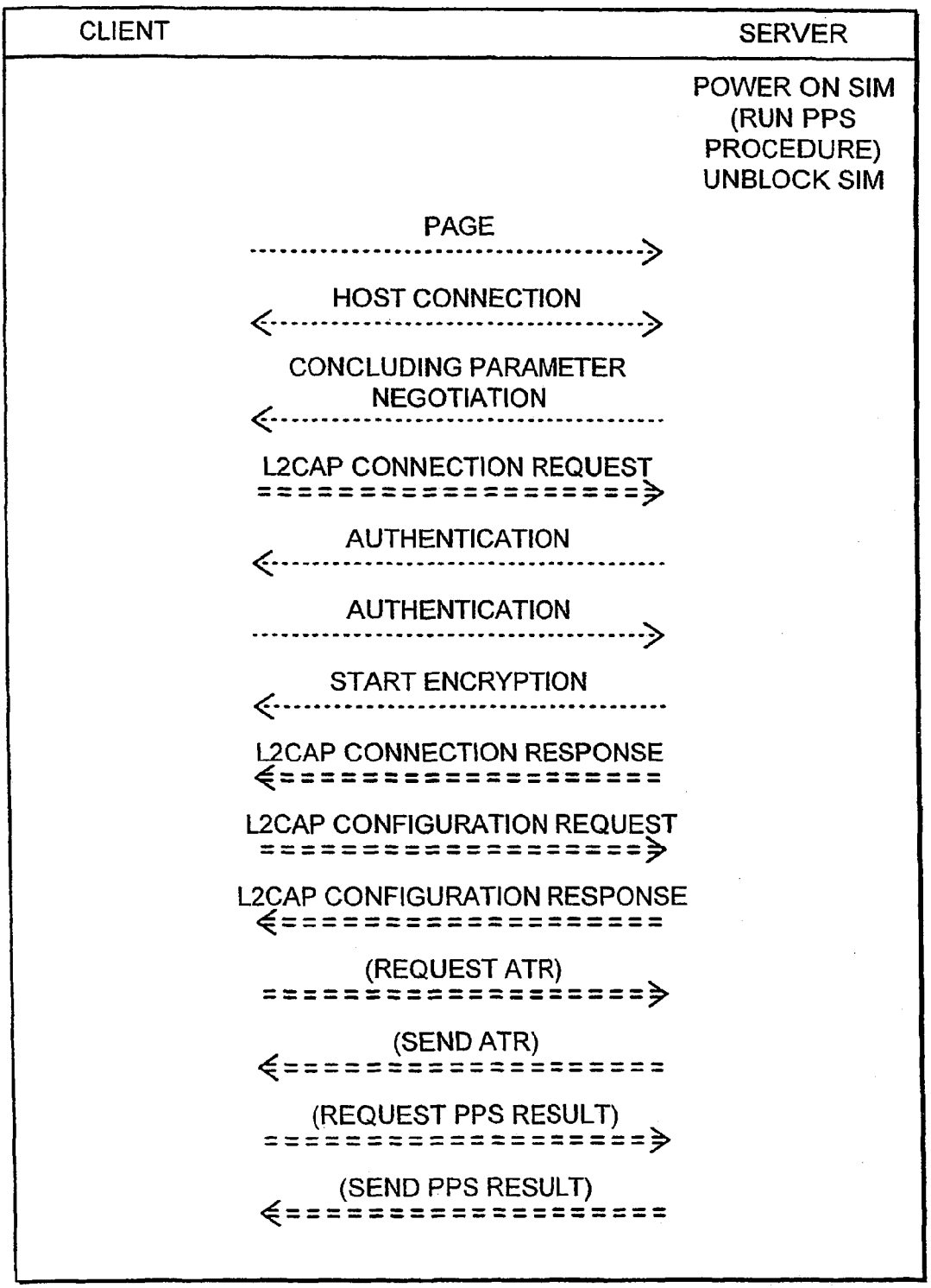
FIG. 6 is a diagram showing the signalling for a client when connecting to a server.
Figure 7:
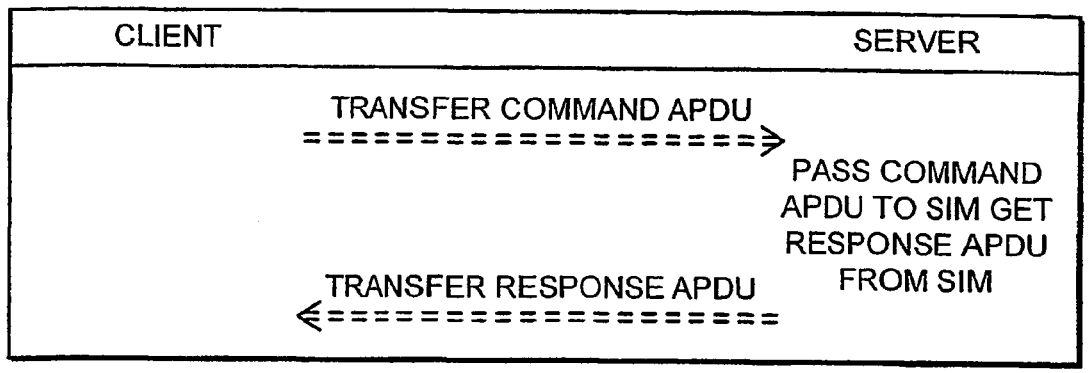
FIG. 7 is a diagram showing the successful exchange of ADPUs between the client and server.
Figure 8:
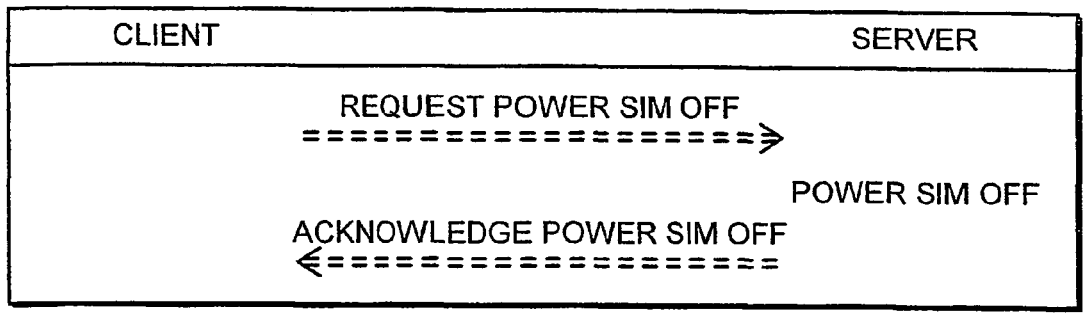
FIG. 8 is a diagram showing the successful outcome when a client requests a server to power off the SIM.
Figure 9:
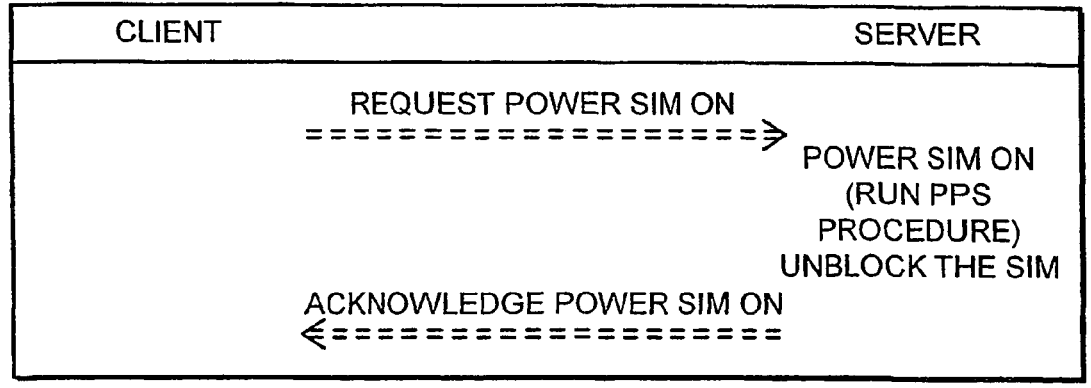
FIG. 9 is a diagram showing the successful outcome when a client requests the server to power on the SIM.
Figure 10:
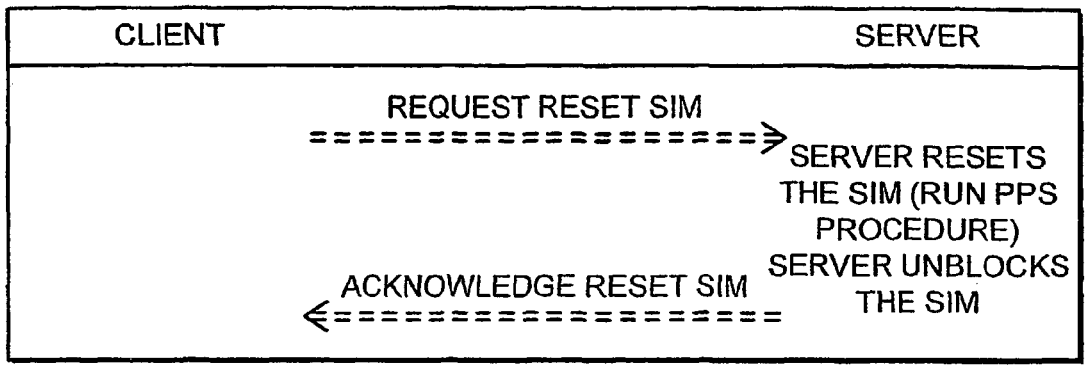
FIG. 10 is a diagram showing the successful outcome when a client requests the server to reset the SIM.
Figure 11:
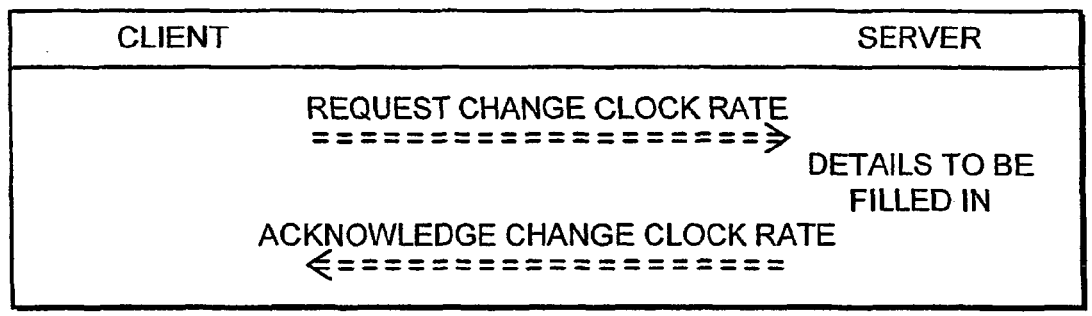
FIG. 11 is a diagram showing the successful outcome when a client requests the server to change the clock rate of the SIM.
Figure 12:
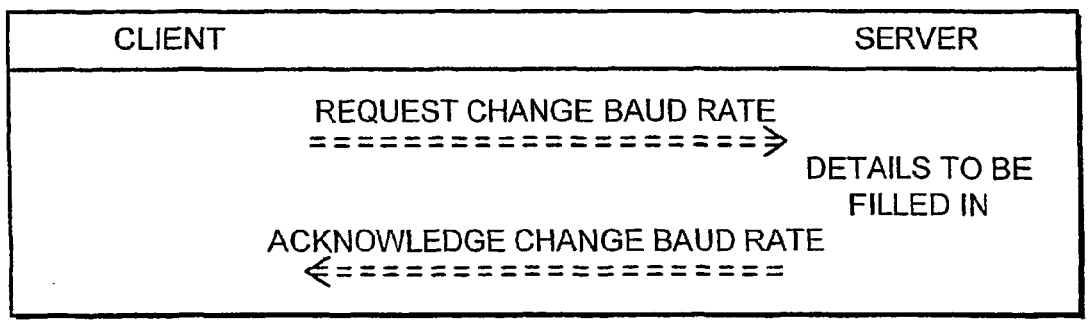
FIG. 12 is a diagram showing the successful outcome when a client requests the server to change the baud rate of the SIM.
Figure 13:
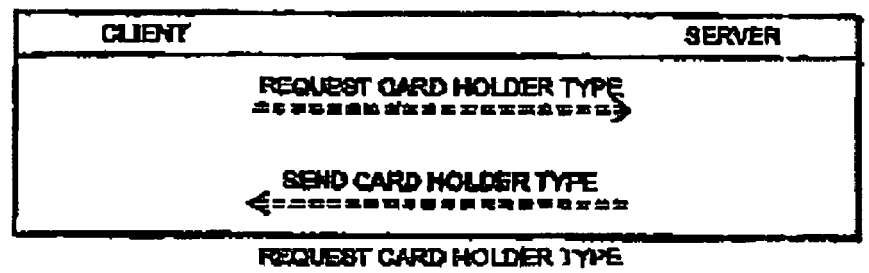
FIG. 13 is a diagram showing the signal flow when a client requests the Card Holder Type from the server.

FIG. 6 is a diagram showing the signalling for a client when connecting to a server. Once the sequence has been performed, the client and server can start exchanging APDUs.

Before the connection is established, the server has to power on and unblock the SIM. The SIM must not be in use for a connection to a cellular network. The connection between client and server can either be released by the client or the server.

Before the client can initiate the connection release, it has to close the connection to the cellular network. If the server initiates the connection release, the client also has to close the connection to the cellular network immediately.

For the APDU transfer, the Transfer Command APDU and Transfer Response APDU procedures are used.

The client asks the server to send the ATR from the SIM. Following the request of the client, the server sends the client the ATR. This uses the Transfer ATR procedure.

The client asks the server to send it the result of the PPS procedure. Following the request of the client, the server sends the client the requested information. If no PPS procedure was performed, an appropriate error message is sent to the client. The Transfer PPS Result procedure is used for this feature.

The client requests the server to power the SIM off, i.e. to remove the voltage from the card. After powering the SIM off successfully, the server sends an acknowledgement message to the client. If powering off failed for any reason, an appropriate error message is sent to the client. The Power SIM Off procedure is used for this feature.

The client requests the server to power the SIM on, i.e. to apply a supply voltage and clock signal to the SIM. After powering the SIM on, the server may perform a PPS procedure. It should then unblock the SIM again. If the SIM was powered on successfully, the server sends an acknowledgement message to the client. If powering on failed for any reason, an appropriate error message is sent to the client. The Power SIM On procedure is used for this feature.

The client requests the server to reset the SIM. After resetting the SIM, the server may perform a PPS procedure. It should then unblock the SIM again. If the SIM was reset successfully, the RAA Server sends an acknowledgement message to the RAA Client. If resetting failed, for any reason, an appropriate error message is sent to the RAA Client. The Reset SIM procedure is used for this feature.

The client requests the server to change the clock rate, that is applied to the SIM. After changing the clock rate successfully, the server sends an acknowledgement message to the client. If changing the clock rate fails, an appropriate error message is sent to the client. The Change Clock Rate procedure is used for this feature.

The RAA Client requests the server to change the baud rate used for communication with the SIM. After changing the baud rate successfully, the server sends an acknowledgement message to the client. If changing the baud rate fails, an appropriate error message is sent to the client. The Change Baud Rate procedure of the protocol is used for this feature.

The client asks the server to send him its Card Holder Type. Following the request of the client, the server sends the client its Card Holder Type. The Transfer Card Holder Type procedure is used for this feature.

If the server or the client detect a link loss, the client shall immediately close existing connections to the cellular network.

It is preferable that only the server may perform inquiry scan. The server shall use the Limited Inquiry Access Code.

A device which is active in the RAA Server role of the Cordless Telephony profile shall, in the Class of Device field:
1. Set the "Telephony" bit in the Service Class field
2. Indicate "server" as Major Device class This may be used by an inquiring device to filter the inquiry responses.

Preferably, paging is performed only by the client. Normally, when not connected to a server, a client will perform a periodical paging of the server.

The time between paging attempts (which determines the average latency for in-range detection) is not specified.

The server shall at least support one of the page scan types R0, R1 and R2. Usage of page scan type R0 gives the highest performance. It is recommended that the server devotes as much of its free capacity as possible to page scanning. The client shall at least support one of the page scan types R0, R1 and R2.

Since most features on the link controller (LC) layer have to be activated by link manager protocol (LMP) procedures, errors will mostly be caught at that layer. However, there are some LC procedures that are independent of the LMP layer, e.g. inquiry, paging or usage of certain packet types. Misuse of such features is difficult or sometimes impossible to detect. There is no mechanism defined to detect or prevent such use.

After the following sequence has been performed, the client and server can start exchanging APDUs.

Those skilled in the art will appreciate some devices may act as both client and server. Alternatively, if a terminal never includes a SIM, it is only required to function as the client. In different circumstances a terminal may offer its SIM to an external device, or alternatively may remotely access the SIM of another device.

The first and second devices can take many forms e.g. one or both may be a radio telecommunications device (in particular a radio telephony device) or a games console. Other forms of device are also envisaged and this term should be construed broadly.

Reference to wireless links could equally be replaced by direct wire connections without detracting from the inventive concepts contained herein.

References to smartcards (or electronic data cards) is not limited to smartcards for use with radiotelephones and is also intended to include other smartcards including WIMs, cash cards for electronic commerce, security cards etc.

The invention claimed is:

1. An apparatus comprising a first device operable with a second device having an electronic data card associated therewith, information on the electronic data card of the second device being useable by and accessible by the first device, wherein the first device and the second device are connectable to one another via a local wireless link and the first device is configured to use the information on the electronic data card via the local wireless link to connect to a cellular network, and the second device being configured to be prevented from having a connection to the cellular network during the time it is granting the first device access to the electronic data card.

2. Apparatus as claimed in claim 1, wherein the first device is configured to make calls to, and receive calls from the cellular network using the information on the electronic data card.

3. Apparatus as claimed in claim 1, wherein the information on the electronic data card is transferable from the electronic data card to the first device.

4. Apparatus as claimed in claim 1, wherein the local wireless link is a low power radio frequency link.

5. Apparatus as claimed in claim 1, wherein the electronic data card is a Subscriber Identity Module (SIM) card.

6. Apparatus as claimed in claim 1, wherein the second device is a portable radio telephone.

7. A car comprising an apparatus as claimed in claim 1.

8. Apparatus comprising a first device having an electronic data card associated therewith, operable with a second device, information on the electronic data card of the first device being useable by and accessible by the second device, wherein the first device and the second device are connectable to one another via a local wireless link and the first device is arranged such that the second device is operable to use the information on the electronic data card via the local wireless link to connect to a cellular network, and the first device being configured to be prevented from having a connection to the cellular network during the time it is granting the second device access to the electronic data card.

9. Apparatus as claimed in claim 8, wherein the second device is configured to make calls to, and receive calls from the cellular network using the information on the electronic data card.

10. Apparatus as claimed in claim 8, wherein the information on the electronic data card is transferable from the electronic data card to the second device.

11. Apparatus as claimed in claim 8, wherein the local wireless link is a low power radio frequency link.

12. Apparatus as claimed in claim 8, wherein the electronic data card is a Subscriber Identity Module (SIM) card.

13. Apparatus as claimed in claim 8, wherein the first device is a portable radio telephone.

14. A method comprising: providing a first device operable with a second device having an electronic data card associated therewith, information on the electronic data card of the second device being useable by and accessible by the first device, wherein the first device and the second device are connectable to one another via a local wireless link; configuring the first device to be able to use the information on the electronic data card via the local wireless link to connect to a cellular network, and the second device being configured to be prevented from having a connection to the cellular network during the time it is granting the first device access to the electronic data card.

15. A method as claimed in claim 14, comprising configuring the first device to be able to make calls to, and receive calls from the cellular network using the information on the electronic data card.

16. A method as claimed in claim 14, comprising transferring information on the electronic data card to the first device.

17. A method as claimed in claim 14, wherein the wireless link is a low power radio frequency link.

18. A method as claimed in claim 14, wherein the electronic data card is Subscriber Identity Module (SIM) card.

19. A method as claimed in claim 14, wherein the second device is a portable radio telephone.

20. A method comprising:
providing a first device having an electronic data card associated therewith, operable with a second device, information on the electronic data card of the first device being useable by and accessible by the second device, wherein the first device and the second device are connectable to one another via a wireless link;
arranging the first device so that second device is operable to use the information on the electronic data card via the wireless link to connect to a cellular network, and
configuring the first device to be prevented from having a connection to the cellular network during the time it is granting the second device access to the electronic data card.

21. A method as claimed in claim 20, comprising transferring information on the electronic data card from the electronic data card to the second device.

22. A method as claimed in claim 20, wherein the local wireless link is a low power radio frequency link.

23. A method as claimed in claim 20, wherein the electronic data card is a Subscriber Identity Module (SIM) card.

24. A method as claimed in claim 20, wherein the first device is a portable radio telephone.

25. A system comprising: a first device and a second device having an electronic data card associated therewith, information on the electronic data card of the second device being useable by and accessible by the first device, wherein the first device and the second device are connectable to one another via a local wireless link and the first device is configured to use the information on the electronic data card via the local wireless link to connect to a cellular network, and the second device being configured to be prevented from having a connection to the cellular network during the time it is granting the first device access to the electronic data card.

26. A memory of a first device encoded with instructions that, when executed, perform a method comprising: using information on an electronic data card of a second device via a local wireless link to connect to a cellular network, the second device having the electronic data card associated therewith, information on the electronic data card of the second device being useable by and accessible by the first device, wherein the first device and the second device are connectable to one another via the local wireless link, the second device being configured to be prevented from having a connection to the cellular network during the time it is granting the first device access to the electronic data card.

27. A memory of a first device encoded with instructions that, when executed, perform a method comprising: enabling a second device to use information on an electronic data card associated with the I first device via a local wireless link to connect to a cellular network, the first device being configured to prevent the first device from having a connection to the cellular network during the time it is granting the second device access to the electronic data card, information on the electronic data card of the first device being useable by and accessible by the second device, wherein the first device and the second device are connectable to one another via the local wireless link.

* * * * *